United States Patent
Stluka et al.

(10) Patent No.: US 8,046,318 B2
(45) Date of Patent: Oct. 25, 2011

(54) AUTOMATED SYSTEM FOR CHECKING PROPOSED HUMAN ADJUSTMENTS TO OPERATIONAL OR PLANNING PARAMETERS AT A PLANT

(75) Inventors: Petr Stluka, Prague (CZ); Jiri Rojicek, Prague (CZ)

(73) Assignee: Honeywell International Inc., Morristown, NJ (US)

(*) Notice: Subject to any disclaimer, the term of this patent is extended or adjusted under 35 U.S.C. 154(b) by 838 days.

(21) Appl. No.: 12/103,589

(22) Filed: Apr. 15, 2008

(65) Prior Publication Data
US 2009/0259331 A1    Oct. 15, 2009

(51) Int. Cl.
G06F 17/00    (2006.01)
G06N 5/00    (2006.01)
G05B 9/02    (2006.01)

(52) U.S. Cl. .................................. 706/45; 700/80
(58) Field of Classification Search .......... 706/45; 700/80
See application file for complete search history.

(56) References Cited

U.S. PATENT DOCUMENTS

| | | | |
|---|---|---|---|
| 5,581,242 A | 12/1996 | Arita et al. | |
| 5,805,465 A | 9/1998 | Itoh | |
| 2003/0105775 A1 | 6/2003 | Shimada | |
| 2005/0197803 A1* | 9/2005 | Eryurek et al. | 702/185 |
| 2005/0216953 A1* | 9/2005 | Ellingson | 726/6 |
| 2005/0267718 A1* | 12/2005 | Guyaguler et al. | 703/10 |
| 2006/0228005 A1* | 10/2006 | Matsugu et al. | 382/116 |
| 2007/0299619 A1 | 12/2007 | Marik et al. | |
| 2008/0013794 A1* | 1/2008 | Kalker et al. | 382/115 |
| 2008/0027678 A1* | 1/2008 | Miller | 702/182 |
| 2008/0027704 A1* | 1/2008 | Kephart et al. | 703/22 |
| 2008/0168356 A1* | 7/2008 | Eryurek et al. | 715/736 |

FOREIGN PATENT DOCUMENTS

| | | |
|---|---|---|
| EP | 1168131 A1 | 1/2002 |
| JP | 62118408 | 5/1987 |
| JP | 1112410 | 5/1989 |
| JP | 3233606 | 10/1991 |
| JP | 9152909 | 6/1997 |
| KR | 20040041906 | 5/2004 |
| KR | 2007-0095303 A | 9/2007 |

* cited by examiner

Primary Examiner — Jeffrey A Gaffin
Assistant Examiner — Vincent Gonzales
(74) Attorney, Agent, or Firm — Jetter & Associates, P.A.

(57) ABSTRACT

A method (400) for automatically checking proposed adjustments by an individual to at least one parameter at a manufacturing plant includes (401) creating a proposed vector including at least one proposed entry from the individual. The proposed vector represents a proposed adjustment to the parameter. A database of historical vectors including the parameter is searched relative to the proposed vector, wherein a number $\geq 0$ of similar stored vectors is identified in the searching based on respective distances (d) relative to the proposed vector (402). If the number $\geq 1$, a distance measure R is calculated from the (d) for the similar stored vector(s) to indicate of how far or close the said proposed vector is to the similar stored vector (403). An alert is provided if the number=0 or R is above a predetermined threshold value (405). The method can be used for validation of proposed production planning parameters or process control parameters.

16 Claims, 4 Drawing Sheets

AUTOMATED SYSTEM FOR CHECKING PROPOSED HUMAN ADJUSTMENTS TO OPERATIONAL OR PLANNING PARAMETERS AT A PLANT

FIELD OF THE INVENTION

The present invention relates to methods, algorithms and systems for automatically evaluating proposed human adjustments at manufacturing plants.

BACKGROUND

In the operation of manufacturing plants, human operator errors can cause significant problems. Although the operation of individual process units, such as a crude distillation unit, is usually controlled by an automated control system, such as a distributed control system (DCS), which interacts with the process via sensors and actuators, the human operator generally remains ultimate responsibility for meeting production targets, and complying with safety, environmental and other various constraints. The operator interacts with the automated control system by manually adjusting set points (target values) of controlled variables (CVs), and adjusting control high/low limits of manipulated variables (MVs) and/or CVs.

FIG. 1 illustrates a conventional individual support system 100. In FIG. 1, plant 101 is a monitor and control object run by a computer program. A plant data collecting unit 102 collects monitoring data from the plant 101. A data processing unit 103 processes the collected monitoring data. A running operation guide processing unit 104 provides running operation guide data on the basis of the data processed by the data processing unit 103. A human-machine interface processing unit 105 displays the guide data provided by the running operation guide processing unit 104 on CRTs 107 and 108, and provides necessary data for the responsible individual, such as an operator, production supervisor, technician or process engineer by retrieving it from a database 106 corresponding to an input from the CRT for dialog with the individual.

The operation guide processing unit 104 is optional. It determines the state of the plant 101 on the basis of the plant monitoring data input through the data processing unit 103, and displays the contents to be performed by the operator in predetermined procedures on the CRTs 107 and 108 through the human-machine interface processing unit 105 as guidance to the operator. In response to that guidance display, the operator selects the contents to be executed from a touch panel provided on the CRTs 107 and 108. The selected contents are output to the plant 101 through the human-machine interface processing unit 105 and through the automated control system 109, such as a distributed control system (DCS). In configurations without the operation guide processing unit 104, the data processing unit 103 passes all process-related information directly to the human-machine interface processing unit 105. Particularly, current values of key process variables (CVs, MVs, DVs) are displayed together with settings (set points, limits) that are being applied to the process by the automated control system 109.

The operation contents to be performed by the operator are displayed merely as guidance and are thus provided to the operator in order to assist the operator in making a decision. However, since the system lacks a function for guarding the plant from operations which the operator may select erroneously, there is a risk that the operations which the operator has selected, such as by careless mistake, will be transmitted to the plant 101, thereby causing a serious accident in the plant.

Such erroneous operations may be suppressed when all functions of the automated control system are switched on. But the operator can always switch off some of the automation functions, and manually control the plant units or pieces of equipment by adjusting related set points and limits. In general, such flexibility can be seen as an advantageous in certain situations, such as when the process needs to be quickly transitioned from one operation mode to another. The responsive individual (e.g. operator) can apply his/her experience and cognitive skills that the control system generally cannot. However, decisions that are implemented manually may lead to errors, and the risk that an erroneous operation will be made on operations cannot be eliminated completely. Therefore, there is a need to help prevent erroneous or unusual human operator entries.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods, algorithms, and implementing systems for automatically generating alerts for responsible individuals interfaced to an automated control system of a manufacturing plant and/or for production planners interfaced to the manufacturing plant. The plant comprises a plurality of field devices having a plurality of sensors and actuators coupled thereto. A proposed current vector is created from at least one proposed entry from the individual, wherein the proposed vector represents a proposed adjustment to the parameter. A database is provided which includes historical vectors comprising the parameter. A search is performed in which a number $\geq 0$ of similar stored vectors are identified based on respective distances (d) relative to the proposed vector. If the number of similar vectors is $\geq 1$, a distance measure (R) is calculated from (d) for the similar stored vector(s) to indicate of how far or close the proposed vector is to the similar stored vector(s). The number of similar vectors may also be counted, and used to calculate R. The individual responsible for the entry and/or optionally one or more other individuals are then alerted when the number=0 or R is above its predetermined threshold value.

In one embodiment, the database comprises stored control signals and stored sensor readings, and the method implements validation of proposed entries by the individual (e.g. operators, technician, supervisors or process engineers) for the parameter, wherein the parameter is related to the control signals or the sensor readings. In another embodiment, the database comprises production limits and production targets, and the method implements production planning validation of proposed entries by the individual (e.g. a planner) for the parameter, wherein the parameter is related to the production limits or production targets.

DETAILED DESCRIPTION

Figure 1:
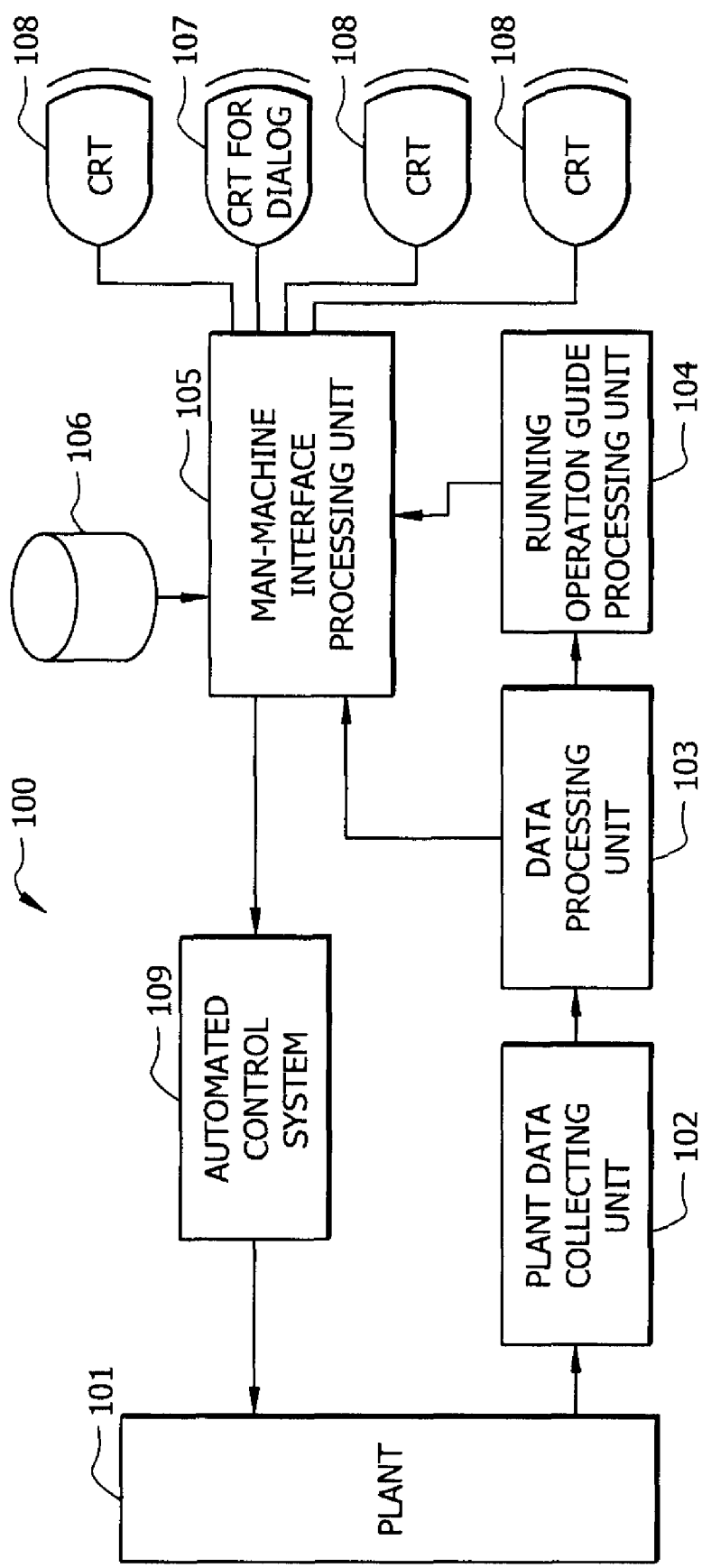
FIG. 1 is a block diagram of a conventional operator support system.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Embodiments of the invention provide methods for automatically generating alerts, such as warnings, for individuals (e.g. process operators, technicians, supervisors, or process engineers) or planners interfaced to an automated control system of a manufacturing plant. The plant generally comprises a plurality of field devices having a plurality of sensors and actuators coupled thereto. The control system can be a distributed control system (DCS). In the case of process parameters, the alert can be used to prevent erroneous, unusual, and in some instances potential dangerous plant operation.

For the operational entry embodiment, for which the present invention is generally described herein, the proposed current operating point vector is created by merging current readings obtained from the sensors, the current control signals currently being applied to the actuators, and at least one proposed operator entry. The operator entry generally modifies at least one of the current control signals associated with CVs or MVs to reflect an adjustment of at least one of a set point (target values) of a CV, or an adjustment of a control limits associated with the MV or CV. A historical database comprising a plurality of stored operating point vectors each comprising stored control signals, stored sensor readings, and optionally at least one associated stored risk measure is searched to identify similar stored operating point vector relative to the proposed operating point vector, wherein similarity is based on distance (e.g. based on being geometrically close). The number of similar vectors is generally counted and their individual distances processed to calculate a distance measure (R). A measure of riskiness (r) of the proposed operating point is optionally calculated when the historical database includes associated risk measures for the similar stored operating point vector(s).

The individual (e.g. process operator and/or a supervisor) can then be alerted, such as by a warning message or audible alarm, when the distance measure R is above its predetermined threshold value. Optionally, r may also be compared to its predetermined threshold value and used for the alert if R is less than its predetermined threshold. The warning can alert the individual of a potentially unusual or risky set of proposed parameters and thus allows the individual to reconsider and modify the proposed entry. Following modification, the method can be repeated with the changed proposed current operating point vector.

Thus, operational entry embodiments of the invention can prevent errors or unusual entries which may be risky by automatically checking entries of individuals to detect unusual combinations of entries and actual sensed values of CVs, MVs and DVs (disturbance variables). For example, it can be determined whether the process has ever been operated in the proposed operation region. The operation region is generally defined by readings obtained from the sensors and current control signals. For example, if similar combinations of sensor readings and control parameters applied in the past have caused operational problems, such as a high alarm rate, process upsets, or off spec production, the individual can be automatically alerted that the proposed current operating point vector deserves at least further consideration before implementation.

At least two types of proposed entries can be detected and provided as alerts to the individual responsible for the entry. A first type of entry in which an alert is generally suitable is unusual entries, which are entries which lead to an unusual operating regime, such as a regime quite different from regimes the process has been operated previously (see FIG. 2 described below). A second type of proposed entry in which a warning is generally suitable is "risky" entries which are entries that were applied in the past, but caused operational problems such as a high alarm rate, abnormal events, and/or off spec production (e.g. low product yield). When based on process history, algorithms according to the invention can look back to process history and check how "far" or "close" the proposed new operating point is from typical operating regions. As described above, the algorithm can also calculate a "measure of riskiness" (r) for the new proposed operating point, such as based on riskiness from similar past operating points.

As known in the art, a controlled process can be described by a set of control signals (e.g. limits and/or set points) and sensor readings that provide measurements for CVs, MVs, and DVs. Individuals can manipulate the CVs and MVs using the associated control set points and limits. Optionally, at least one measure of riskiness (r) can also be defined, such as an alarm rate, occurrence of abnormal events (e.g. reactor temperature exceeding safety limit, or overfilling of a vessel), production being off specification, or an abnormally high energy consumption. The control signals, sensor readings and optionally risk measures can be stored in a historical database. Alternatively, simulation, in whole or in part, can be used to generate to populate the stored database.

In embodiments of the invention the proposed current operating point vector is created by merging current control signals for the CVs, MVs and current sensed operating points for the CVs, MVs, and DVs with one or more manual entries/updates of control set points and limits provided by the individual. The proposed operating point vector thus can be a numerical vector composed of CVs, MVs, and DVs with their associated proposed set points and limits. The stored database is searched for similar past operating point vectors. Similarity can be defined as geometrical proximity of two operating multidimensional points and in one embodiment can be implemented in form of a distance function. One distance function that can be used is a Euclidean distance or Euclidean metric which is the "ordinary" distance between two points that one would measure with a ruler, which can be proven by repeated application of the Pythagorean theorem. By using this formula as distance, Euclidean space becomes a metric space (even a Hilbert space). Other distance functions can be used as well, for instance those defined by the Minkowski metrics family. Distances (d) for each of the retrieved set of historical vectors, as well as the count of the retrieved vectors can be processed to calculate a quantitative measure (R) which is indicative of how far or close the new proposed operating point vector is to the similar historical vectors, such as a computed average distance. A quantitative measure of riskiness (r) can be calculated based on the set of historical similar vectors using statistical processing, such as described in more detail below.

Figure 2:
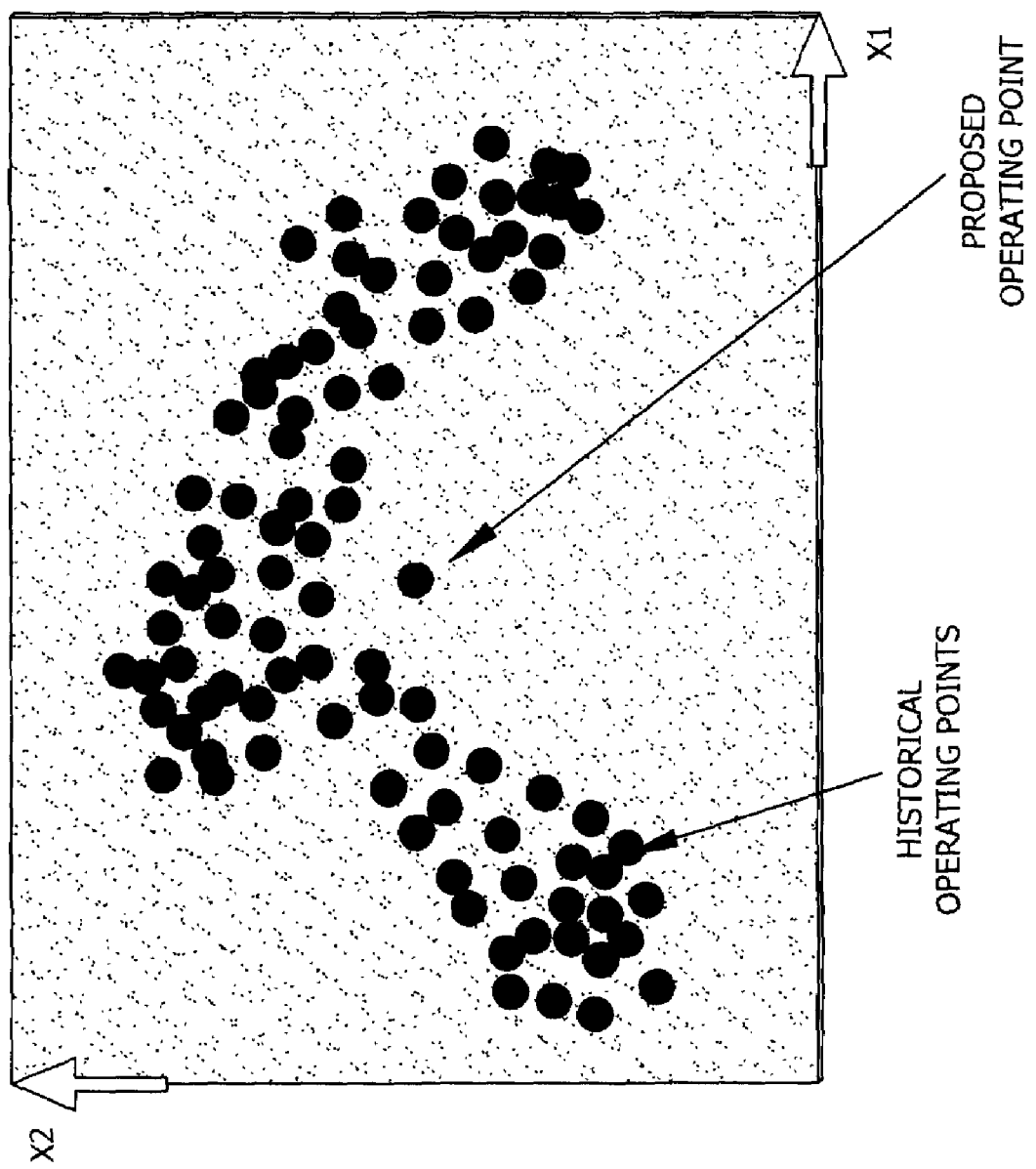
FIG. 2 provides a two-dimensional depiction of an unusual proposed operating point vector.

FIG. 2 provides a two-dimensional depiction of an unusual proposed operating point vector that can be generated based on an operator entry. The proposed operating point is shown a significant distance from any of the stored historical operating points. Based on identification of the proposed new operating point as being an unusual entry a warning to the individual can be generated. Alternatively or in combination, based on a determination that the proposed operating point vector has a high relative level of riskiness, an alert to an individual can also be generated. The level of riskiness (r) can be based on whether similar historical operating points caused any operation problems in the past.

Figure 3:
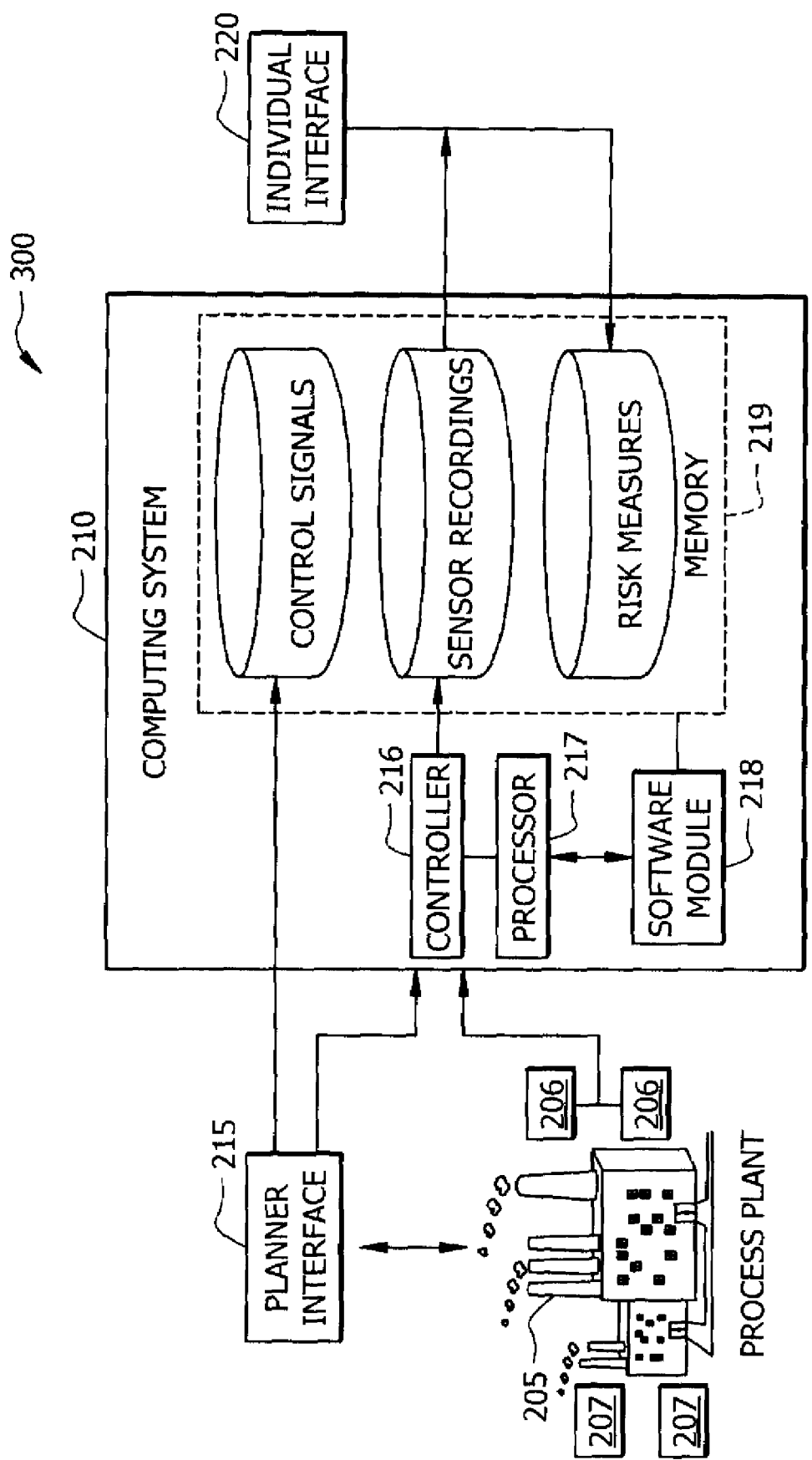
FIG. 3 is a high level schematic of a plant comprising a process controller which provides automated validation of plant entries by an individual, according to an embodiment of the invention.

FIG. 3 is a high level schematic of a system 300 comprising a manufacturing or processing plant 205 having a process controller which automatically adjusts operation of the process or equipment. Plant 205 comprises a plurality of sensors 206 for reporting actual real-time parametric values. Sensors 206 are operable for obtaining values for a plurality of CVs, MVs and DVs. A plurality of actuators 207 control various aspects of the process run by plant 205.

A planner interface 215 for authorized users (e.g. process planners) is shown connected to plant 205, such as for monitoring and for entering information that changes production limits and production targets. Planner interface 215 is also coupled to computing system 210. A planner interface is not generally needed to provide alerts responsive to certain proposed entries by individuals. However, an embodiment of the invention uses the planner interface 215 and associated computing system 210 to check manual entries of a planner during the process of translating the production plan to daily operating instructions, or during the process of manually adjusting already created instructions. This planner entry checking can be based on distances between vectors analogous to the checking of individual entries described above by comparing proposed operating point vectors to historical operating point vectors.

Computing system 210 comprises controller 216 and processor 217. Software module 218, which generally is loaded with algorithms according to embodiments of the invention, is coupled to processor 217. Computing system 210 also includes memory 219, which is shown including a stored historical database comprising historical operating vectors comprising control signals, sensor readings, and risk measures. Computing system 210 together with sensors 206 and actuators 207 can comprise a distributed control system (DCS), such as where sensors 206 and actuators 207 are smart microprocessor comprising field devices. Operator interface 220 is coupled to the computing system 210 which is operable for entering operator entries. The algorithm for automated validation of plant operator entry can be stored in software module 218 run by processor 217.

Figure 4:
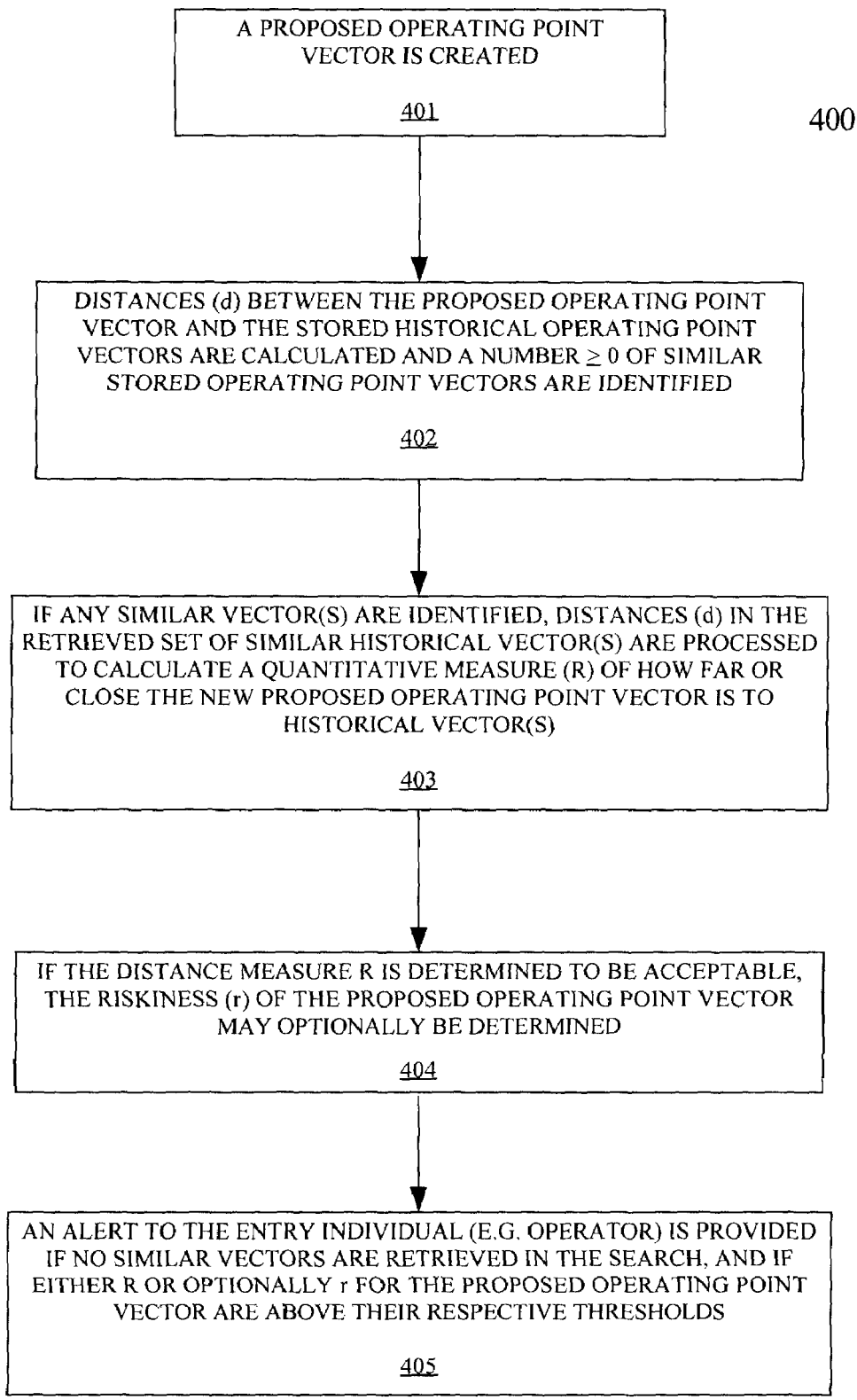
FIG. 4 is a flow chart for an exemplary method for automatically generating alerts for an individual interfaced to an automated control system of a plant, according to an embodiment of the invention.

The algorithm in the case of validation of operational entries can implement the following steps in method 400 according to an embodiment of the invention described relative to FIG. 4. In step 401, a proposed operating point vector is created. The proposed operating point vectors X={X1, ... , XN} are generally defined in N-dimensional space, but the description below is in two-dimensional space for the sake of simplicity. Method 400 begins with step 401, in which a proposed operating point vector is created. The proposed multi-dimensional operating point vector X can comprise vectors of current sensor readings of CVs c={c1, ... , cI}, MVs (MV) m={m1, ... , mJ}, DVs (DV) d={d1, ... , dK}, and control signals reflecting the proposed operator modification associated with the CVs and MVs comprising set points (target values) s={s1, ... , sL} and control limits l={llow, 1, lhi, 1, ... , llow, M, lhi, M}. In this case, the operating point vector X={c, m, d, s, l} may include up to five different types of variables. To improve the processing speed of the algorithm, selected parameters of the X vector regarded by the process engineer or other trained individual associated with the plant as being most significant can be the only parameters processed by the algorithm. For example, parameter selection can result in the operating point vector being 3-dimensional, as compared to the original operating point vector X which has ten dimensions.

In step 402 distances (d) between the proposed operating point vector and the stored historical operating point vectors are then calculated, and a number $\geq 0$ of similar stored operating point vectors are identified from the historical database based on respective distances (d) to the proposed operating point vector. For example, a Euclidian distance can be used for the distance (d) parameter.

$$d^2 = \sum_{i=1}^{N} (x_i - x_i^*)^2$$

where $d^2$ is the squared Euclidean distance between the proposed current operating vector X and a historical operating vector X*, or selected subsets thereof. The distances can be calculated over all N parameters {x1, ... , xN} as shown in the equation above, or based on parameter selection described above only over a selected subset of the N parameters (e.g. depending on a specific implementation). In one embodiment, the following constraint can be used to select the similar stored operating point vectors:

$$d^2 = \sum_{i=1}^{N} \left(\frac{x_i - x_i^*}{h_i}\right)^2 \leq 1$$

where {h1, ... , hN} are retrieved vector number control parameters. Retrieved vector number control parameters are generally specified in advance (e.g. applying a heuristic rule that determines specific value of hi as 5% of the range between the historical minimum and historical maximum of the parameter/variable i). Based on calculated distances, similar stored operating vectors X* or subsets thereof can be identified. Using the relation above, the retrieved similar operating vectors X* or subsets thereof satisfy the constraint that its squared Euclidean distance $d^2$ from the proposed current operating vector X (or subset thereof) is less than 1 (or more generally some constant). The total number of retrieved similar historical vectors X* is seen to be directly influenced by the retrieved vector number control vector $\{h1, \ldots, hN\}$. The respective parameters $\{h1, \ldots, hN\}$ can define a neighborhood of a constant/fixed size around the proposed current operating point X. Thus, in operating regions frequently visited by the process the number of similar vectors found in this neighborhood will be relatively large, while in a newly visited operating region the number of similar vectors found in this neighborhood will be relatively small.

In step 403, if similar vector(s) are identified, distances (d) in the retrieved set of similar historical vectors, as well optionally the count of the retrieved similar vectors are processed to calculate a quantitative measure (R) of how far or close the new proposed operating point vector is to the retrieved similar vectors. In one embodiment R comprises the count of similar points (in this specific case, the distances are not used at all). R can also be the sum of all distances to the similar points, or average of all distances (the count becomes the denominator). R can be also the weighted average where the weight can be computed by a function, such as by a kernel function.

In step 404, if the distance measure R is determined to be acceptable, such as by comparison to a predetermined threshold, the riskiness (r) of the proposed operating point vector may optionally be determined. The stored database can be checked to determine values of individual risk measures r associated with similar historical operating vectors X* or subsets thereof. r can be evaluated over an interval of time T that starts at the time that corresponds to system operation using the stored operating vector X* (or a subset thereof) and ends a specific time (e.g. 60 minutes) after that time. T can also be assumed to be zero. In that embodiment, only point-in-time estimates of risk measures will be used, not evaluated over a specific time interval. For example, r can be defined as the number of alarms that occurred over interval T, or the number of abnormal situations/events over interval T.

In step 405 an alert to the entry individual (e.g. operator) is provided if no similar vectors are retrieved in the search, and if either R or optionally r for the proposed operating point vector are above their respective thresholds. These thresholds can be set by process engineers. Alternatively, these thresholds can be determined by an automated procedure that is run during the algorithm setup. The thresholds can also be adjusted later after the validation system is in operation for some period of time. Responsive to receiving the warning, the operator or other individual can modify the proposed current operating vector X. Alternatively, the operator can implement the proposed current operating vector X, such as following engineering approval. The individual's entry can be blocked and provided with explanation.

This invention can used as an addition to existing DCS that has a historization function, such as for system 300 shown in FIG. 3. In such a system, algorithms for automated checking of manual operator entries according to embodiments of the invention can be added as a supervisory module that is connected to the historical repository of stored control signals and sensor readings. Warnings generated by algorithms according to embodiments of the invention can be sent to human machine interface (HMI) used by the operator.

Embodiments of the invention thus can be used to implement new aspects of supervisory control of control equipment to help prevent erroneous or unusual human operator entries that can cause a serious accident in plants, including large scale plants, such as nuclear, thermal or hydraulic, electric power, iron and steel, a chemical or petrochemical, plant and water treatment, oil refining, pharmaceutical, paper-making, gas processing, etc.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also generally be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

The Abstract of the Disclosure is provided to comply with 37 C.F.R. §1.72(b), requiring an abstract that will allow the reader to quickly ascertain the nature of the technical disclo-

We claim:

1. A method for automatically checking proposed adjustments by an individual to at least one parameter at a manufacturing plant, comprising:

creating a proposed vector comprising at least one proposed entry from said individual, said proposed vector representing a proposed adjustment to said parameter;

searching a database of historical vectors comprising said parameter relative to said proposed vector, wherein a number $\geq 0$ of similar stored vectors is identified in said searching based on respective distances (d) relative to said proposed vector;

if said number $\geq 1$, calculating a distance measure R from said (d) for said similar stored vector to indicate of how far or close said proposed vector is to said similar stored vector, and providing an alert if said number=0 or said R is above a predetermined threshold value.

2. The method of claim 1, wherein said database comprises production targets and production limits, and said method implements a production planning validation of proposed entries by said individual for said parameter, wherein said parameter is related to said production targets or said production limits.

3. The method of claim 1, wherein said database comprises stored control signals and stored sensor readings and said vector comprises an operating point vector, and said method implements validation of proposed entries by said individual for said parameter, wherein said parameter is related to said control signals or said sensor readings.

4. The method of claim 3, wherein if said number $\neq 0$ and said R is below its predetermined threshold value, calculating a measure of riskiness (r) of said proposed operating point vector from risk measures associated of said similar operating point vectors, and providing said alert if said r is above its predetermined threshold values.

5. The method of claim 4, wherein said r comprises at least one selected from the group consisting of alarm rate, occurrence of abnormal events, production quality parameter being off-specification, or abnormally high energy consumption.

6. The method of claim 4, wherein said alert is triggered when both said R and said r are above said respective predetermined threshold values.

7. The method of claim 1, wherein said database comprises a historical database.

8. The method of claim 1, wherein said database comprises an at least partially simulated database.

9. The method of claim 1, wherein said similar stored vector is selected based on said R being less than a predetermined constant.

10. The method of claim 1, wherein said R comprises a Euclidean distance.

11. The method of claim 1, wherein said alert is sent to a human machine interface (HMI) used by said individual.

12. A machine readable storage for automatically generating alerts for an individual interfaced to an automated control system of a manufacturing plant, said plant comprising a plurality of field devices having a plurality of sensors and actuators coupled thereto, said machine readable storage having stored thereon a computer program, wherein the machine readable storage is non-transitory machine readable storage and comprises:

code for creating a proposed vector comprising at least one proposed entry from said individual, said proposed vector representing a proposed adjustment to said parameter;

code for searching a database of historical vectors comprising said parameter relative to said proposed vector, wherein a number $\geq 0$ of similar stored vectors is identified in said searching based on respective distances (d) relative to said proposed vector;

code for if said number $\geq 1$, calculating a distance measure R from said (d) for said similar stored vector to indicate of how far or close said proposed vector is to said similar stored vector, and code for providing an alert if said number=0 or said R is above a predetermined threshold value.

13. The machine readable storage of claim 12, wherein said database comprises production targets and production limits, and said method implements a production planning validation of proposed entries by said individual for said parameter, wherein said parameter is related to said production targets or said production limits.

14. The machine readable storage of claim 12, wherein said database comprises stored control signals and stored sensor readings and said vector comprises an operating point vector, and said method implements validation of proposed entries by said individual for said parameter, wherein said parameter is related to said control signals or said sensor readings.

15. A manufacturing system, comprising:

a manufacturing plant controlled by an automated control system, said plant comprising a plurality of field devices having a plurality of sensors and actuators coupled thereto;

a computing system coupled to said plant comprising a controller, processor and software module, and memory including a database comprising a database of historical vectors comprising said parameter, and an operator interface for interfacing an individual to said computing system or a planner interface for interfacing a planner to said computing system operable for changing said parameter;

wherein said software module includes:

code for creating a proposed vector comprising at least one proposed entry from said individual, said proposed vector representing a proposed adjustment to said parameter;

code for searching a database of historical vectors comprising said parameter relative to said proposed vector, wherein a number $\geq 0$ of similar stored vectors is identified in said searching based on respective distances (d) relative to said proposed vector;

code for if said number $\geq 1$, calculating a distance measure R from said (d) for said similar stored vector to indicate of how far or close said proposed vector is to said similar stored vector, and code for providing an alert if said number=0 or said R is above a predetermined threshold value.

16. The system of claim 15, wherein said automated control system comprises a distributed control system (DCS).

* * * * *